(12) United States Patent
Nunokawa

(10) Patent No.: US 12,603,304 B2
(45) Date of Patent: Apr. 14, 2026

(54) FUEL CELL AND MOBILE UNIT

(71) Applicant: SUBARU CORPORATION, Tokyo (JP)

(72) Inventor: Takumi Nunokawa, Tokyo (JP)

(73) Assignee: SUBARA CORPORATION, Tokyo (JP)

( * ) Notice: Subject to any disclaimer, the term of this patent is extended or adjusted under 35 U.S.C. 154(b) by 515 days.

(21) Appl. No.: 18/233,042

(22) Filed: Aug. 11, 2023

(65) Prior Publication Data

US 2024/0079610 A1     Mar. 7, 2024

(30) Foreign Application Priority Data

Sep. 5, 2022     (JP) ................................. 2022-140611

(51) Int. Cl.
| | |
|---|---|
| *H01M 8/0267* | (2016.01) |
| *H01M 8/0206* | (2016.01) |
| *H01M 8/0258* | (2016.01) |
| *H01M 8/0276* | (2016.01) |
| *H01M 8/2483* | (2016.01) |

(52) U.S. Cl.
CPC ....... *H01M 8/0267* (2013.01); *H01M 8/0206* (2013.01); *H01M 8/0258* (2013.01); *H01M 8/0276* (2013.01); *H01M 8/2483* (2016.02)

(58) Field of Classification Search
CPC .................................................. H01M 8/0267
See application file for complete search history.

(56) References Cited

U.S. PATENT DOCUMENTS

2016/0260987 A1     9/2016   Watanabe

FOREIGN PATENT DOCUMENTS

| | | |
|---|---|---|
| JP | 2007-123181 A | 5/2007 |
| JP | 2013-54872 A | 3/2013 |
| JP | 2017-16942 A | 1/2017 |
| WO | WO 2015072584 A1 | 5/2015 |

*Primary Examiner* — Stephan J Essex
(74) *Attorney, Agent, or Firm* — McGinn IP Law Group, PLLC

(57) ABSTRACT

A fuel cell includes metallic separators and has an anode-gas channel, a cathode-gas channel, and a coolant channel. The metallic separators include a flat separator and a channel-equipped separator. A peripheral edge of a manifold of the channel-equipped separator whose first surface has a channel serving as the coolant channel is provided with a step. The step surrounds the peripheral edge of the manifold to increase a height of a gas inlet disposed at a second surface of the channel-equipped separator. A shortened seal member having a thickness smaller than a thickness of a peripheral seal member provided in a region other than the peripheral edge of the manifold is disposed on the step to surround the peripheral edge of the manifold.

7 Claims, 9 Drawing Sheets

300

FUEL CELL AND MOBILE UNIT

CROSS-REFERENCE TO RELATED APPLICATIONS

The present application claims priority from Japanese Patent Application No. 2022-140611 filed on Sep. 5, 2022, the entire contents of which are hereby incorporated by reference.

BACKGROUND

The disclosure relates to fuel cells and mobile units, such as fuel cell vehicles, equipped with the fuel cells.

In a typical fuel cell system that uses a fuel cell, one electrode (fuel electrode) is supplied with hydrogen gas while the other electrode (air electrode) is supplied with oxygen gas, and electric energy is obtained as a result of a reaction between these gases.

In a fuel cell vehicle equipped with such a fuel cell, about several hundreds of singular cells that are separated from each other by, for example, separators are stacked as a fuel cell stack. Each separator has a function for electrically coupling the cathode and the anode of adjacent singular cells to each other and a function for supplying cathode gas (air) and anode gas (hydrogen) to target electrodes from gas channels provided in the surface of the separator. See, for examples, Japanese Unexamined Patent Application Publication (JP-A) No. 2007-123181, JP-A 2013-54872, PCT International Publication No. WO 2015/072584 A1, and JP-A 2017-16942.

SUMMARY

An aspect of the disclosure provides a fuel cell including metallic separators and having an anode-gas channel, a cathode-gas channel, and a coolant channel. The metallic separators include a flat separator and a channel-equipped separator. A peripheral edge of a manifold of the channel-equipped separator whose first surface has a channel serving as the coolant channel is provided with a step. The step surrounds the peripheral edge of the manifold to increase a height of a gas inlet disposed at a second surface of the channel-equipped separator. A shortened seal member having a thickness smaller than a thickness of a peripheral seal member provided in a region other than the peripheral edge of the manifold is disposed on the step to surround the peripheral edge of the manifold.

An aspect of the disclosure provides a mobile unit including the fuel cell.

DETAILED DESCRIPTION

Figures 1A, 1B:
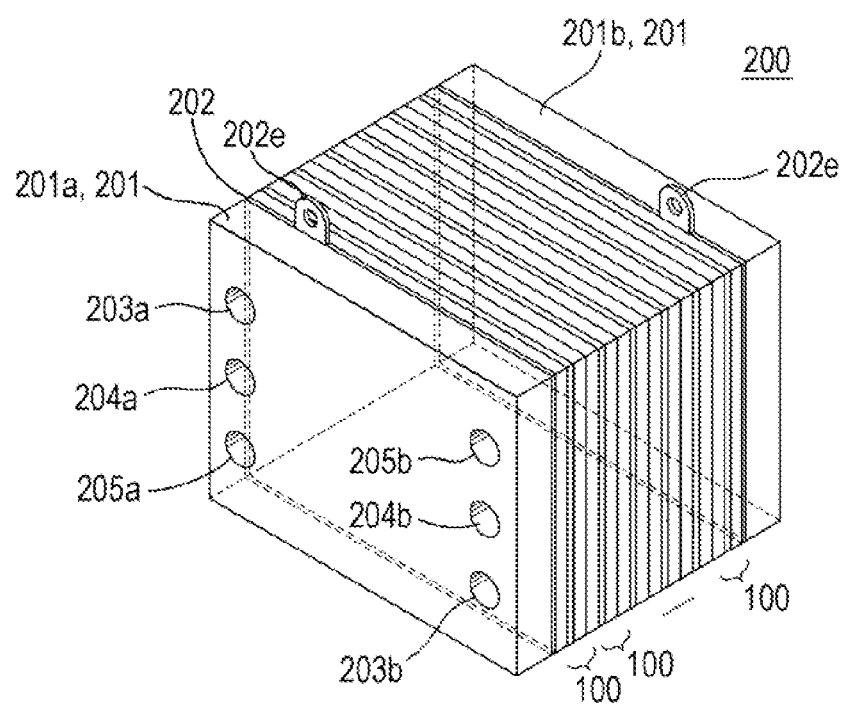
FIG. 1A schematically illustrates a fuel cell stack according to an embodiment.
FIG. 1B is a functional block diagram of a fuel cell vehicle equipped with the fuel cell stack.

In the current technology, in addition to the patent literatures mentioned above, the following problems exist.

For example, when the aforementioned fuel cells are stacked so as to be used as a fuel cell stack, the number of stacked fuel cells may reach about several hundreds of fuel cells in vehicle application. Therefore, it is desirable that the components constituting each fuel cell be reduced in thickness as much as possible. In this regard, for example, using a flat metallic plate as a separator in each fuel cell may contribute to thickness reduction mentioned above.

In one example, PCT International Publication No. WO 2015/072584 A1 proposes a configuration that uses flat plates (i.e., metallic plates with substantially flat principal surfaces) each having a channel and a gas diffusion layer on the surface thereof as separators, and sandwiches a membrane electrode assembly (MEA) with a pair of separators by using a seal member. However, when one of the separators is a flat plate, first gas (e.g., hydrogen) is to be distributed between the flat plate and the MEA, while a coolant and second gas (e.g., air) are to be distributed by the other separator. In this case, the thickness of an air inlet formed with the MEA is reduced to an amount equivalent to the thickness of the gas diffusion layer. This is problematic in that a pressure loss of air introduced from a manifold increases.

It is desirable to provide a fuel cell that uses a flat plate as one of separators and that increases the size of a gas inlet to achieve both pressure-loss reduction and thickness reduction, and to provide a mobile unit, such as a fuel cell vehicle, equipped with the fuel cell.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Fuel Cell Vehicle 300

First, the configuration of a fuel cell vehicle 300 as an example of a mobile unit according to an embodiment of the disclosure will be described with reference to FIG. 1A.

The fuel cell vehicle 300 according to this embodiment includes a fuel cell stack 200, a DC/DC converter 210, an inverter 220, a load (such as an electric motor) 230, and a controller 240. Accordingly, under the control of the controller 240, electric power generated by the fuel cell stack 200 is supplied to the electric motor serving as the load 230 via the DC/DC converter 210 and the inverter 220. The fuel cell vehicle 300 according to this embodiment may further include, for example, a hydrogen tank and various known devices, such as a gas supplying mechanism (e.g., an anode-gas supplier, a cathode-gas supplier, and a refrigerant supplier) equipped in a fuel cell vehicle.

The fuel cell stack 200 includes about several tens to several hundreds of fuel cells 100 serving as singular cells to be described later and stacked in a stacking direction. Each fuel cell 100 has a function for generating electricity by causing fuel gas (hydrogen gas) and oxidation gas (oxygen in the air) to react with each other.

The DC/DC converter 210 is a known transformer that boosts the electric power generated by the fuel cell stack 200 to a desired voltage and that supplies the boosted electric power to the inverter 220. For example, the DC/DC converter 210 executes the aforementioned boosting process via a known chopper circuit.

The inverter 220 has a function for converting direct-current electric power boosted by the aforementioned DC/DC converter 210 into alternating-current electric power suitable for driving the electric motor serving as the load 230 in the subsequent stage. The inverter 220 is not particularly limited so long as the inverter 220 exhibits the above-described function, and may be, for example, any known inverter that includes a three-phase bridge circuit.

The load 230 includes a known electric motor capable of outputting a driving force for driving drive wheels (not illustrated) of the fuel cell vehicle 300. As an alternative to this embodiment in which an electric motor that generates a driving force for driving the drive wheels is described as an example of the load 230, the load 230 may be another electric device equipped in the fuel cell vehicle 300. An example of the electric motor is a known three-phase alternating-current electric motor.

The controller 240 is a known electronic control unit (ECU) equipped in an electric-powered vehicle, and includes a known central processing unit (CPU) serving as an arithmetic processor, a known read-only memory (ROM) serving as a storage element that stores a program and an arithmetic parameter to be used by the CPU, and a known random access memory (RAM) serving as a storage element that temporarily stores various types of information. The controller 240 may further include a battery management unit (BMU) that monitors and controls the state of the battery. The controller 240 may be communicable with another known ECU or various types of sensors (not illustrated) equipped in the fuel cell vehicle 300.

Although a fuel cell vehicle is described as an example of a mobile unit below, the embodiment of the disclosure is applicable to any of various types of mobile units capable of moving by being equipped with a fuel cell system as a driving source. Examples of such various types of mobile units include a marine vessel, an aircraft, and an electric train. In other words, the fuel cell stack 200 according to the embodiment of the disclosure is not limited to being applied to a fuel cell vehicle, and may be applied to another mobile unit, such as a marine vessel or an aircraft.

Fuel Cell Stack 200

The configuration of the fuel cell stack 200 according to this embodiment will now be described with reference to FIG. 1B. It is clear from FIG. 1B that, in the fuel cell stack 200 according to this embodiment, the fuel cells 100 stacked in the stacking direction are sandwiched between a pair of end plates 201. A current collector plate 202 is disposed at the inner side of each end plate 201, so that electric power generated by the fuel cells 100 is extractable via an extraction electrode 202e of the current collector plate 202.

It is clear from FIG. 1B that one side of a first end plate 201a in the cell stacking direction is provided with an oxidation-gas supply port 203a, a refrigerant supply port 204a, and a fuel-gas supply port 205a. The fuel cells 100 are supplied with oxidation gas, a refrigerant, and fuel gas via these supply ports. Likewise, the other side of the first end plate 201a in the longitudinal direction is provided with an oxidation-gas discharge port 203b, a refrigerant discharge port 204b, and a fuel-gas discharge port 205b.

Accordingly, for example, the oxidation gas is supplied into the fuel cells 100 through the oxidation-gas supply port 203a, and is subsequently discharged from the oxidation-gas discharge port 203b. Likewise, the fuel gas is supplied into the fuel cells 100 through the fuel-gas supply port 205a, and is subsequently discharged from the fuel-gas discharge port 205b. The refrigerant (e.g., a known coolant) circulates through the fuel cell stack 200 from the aforementioned refrigerant supply port 204a, and is subsequently discharged from the refrigerant discharge port 204b.

Although the first end plate 201a is provided with the oxidation-gas supply port 203a, the refrigerant supply port 204a, and the fuel-gas supply port 205a in this embodiment, the configuration is not limited to this. In one example, the aforementioned supply ports may be provided in a second end plate 201b instead of the first end plate 201a.

Fuel Cells 100

Figure 2:
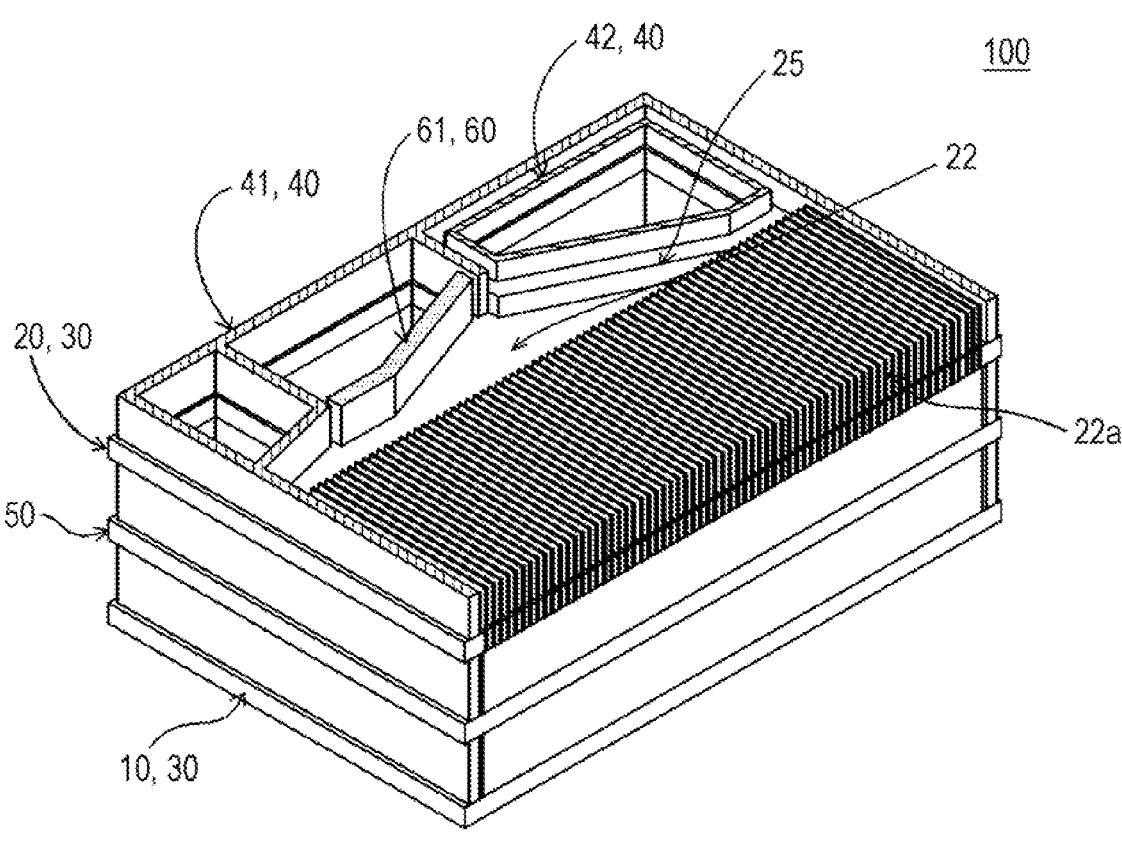
FIG. 2 is a perspective view illustrating a partially extracted area of a fuel cell included in the fuel cell stack according to the embodiment.

The configuration of the fuel cells 100 according to this embodiment will now be described with reference to FIG. 2 to FIG. 11. As illustrated in FIG. 2, each of the fuel cells 100 according to this embodiment includes metallic separators 30 including a flat separator 10 and a channel-equipped separator 20, which will be described later. The metallic separators 30 may consist of one or more flat separators 10 and one or more channel-equipped separators 20.

Although the following description relates to the structure around an inlet hole through which gas and liquid flow into each fuel cell 100, the following description is similarly applicable to the structure around an outlet hole from which gas and liquid are discharged.

The flat separator 10, the channel-equipped separator 20, and seal members 40, to be described later, form an anode-gas channel 11, a coolant channel 22, and a cathode-gas channel 23. Although the coolant channel 22, the cathode-gas channel 23, and the anode-gas channel 11 are layered in this order from a first surface 20a (i.e., a surface of the channel-equipped separator 20 corresponding to the outer side of the fuel cell 100), the configuration according to the embodiment of the disclosure is not limited to this.

1.1. Coolant-Related Channel Structure

A coolant-related channel structure in each fuel cell 100 will now be described with reference to FIG. 2 to FIG. 4 and FIG. 9. It is clear from FIG. 2 to FIG. 4 and FIG. 9 that the coolant channel 22 in the fuel cell 100 is provided over the aforementioned first surface 20a of the channel-equipped separator 20. Since the fuel cells 100 are stacked in the fuel cell stack 200, the flat separator of another neighboring fuel cell 100 is disposed above the aforementioned first surface 20a of the channel-equipped separator 20.

Figures 3, 4:
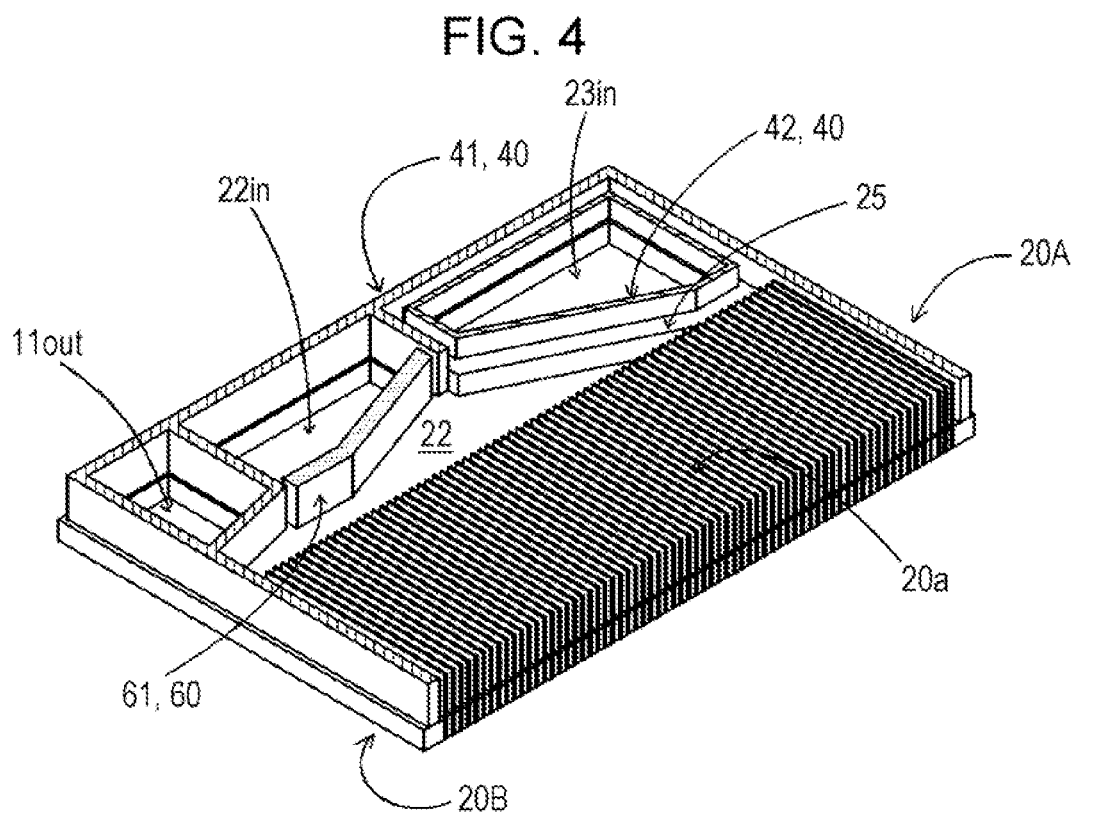
FIG. 3 is a top view partially illustrating a channel-equipped separator of the fuel cell according to the embodiment.
FIG. 4 is a perspective view partially illustrating the channel-equipped separator of the fuel cell according to the embodiment.

As illustrated in FIG. 3 and FIG. 4, the channel-equipped separator 20 has the peripheral edge thereof surrounded by a first seal member 41. A longitudinal end of the channel-equipped separator 20 is provided with a hydrogen outlet hole $11_{out}$ ($H_2$ manifold) through which anode gas flows in, a refrigerant inlet hole $22_{in}$ (refrigerant manifold) through which a refrigerant (such as a coolant) flows in, and an air inlet hole $23_{in}$ (air manifold) through which cathode gas flows in. Although the refrigerant manifold is located between the $H_2$ manifold and the air manifold in this embodiment, the disposition of the inlet holes is not limited to that described above and may be changed, where appropriate. As an alternative to this embodiment in which the refrigerant inlet hole $22_{in}$ is disposed between the air inlet hole $23_{in}$ and the hydrogen outlet hole $11_{out}$, as illustrated, for example, the refrigerant inlet hole $22_{in}$ may be disposed between the air inlet hole $23_{in}$ and a hydrogen inlet hole $11_{in}$.

The hydrogen outlet hole $11_{out}$, the refrigerant inlet hole $22_{in}$, and the air inlet hole $23_{in}$ are separated from one another by the aforementioned first seal member 41. As mentioned above, since the coolant channel 22 is provided above the aforementioned first surface 20a of the channel-equipped separator 20, a first reinforcement member 61 that can distribute the coolant is disposed at the coolant channel 22 side of the refrigerant inlet hole $22_{in}$.

The first reinforcement member 61 distributes the refrigerant (i.e., the coolant in this example) flowing in through the refrigerant inlet hole $22_{in}$, and has enough strength to ensure the seal performance of another seal surface disposed between the channel-equipped separator 20 and a third seal member 43 and continuing from the first reinforcement member 61 in the stacking direction. A specific example of such a first reinforcement member 61 is a known porous member or metal pressed member composed of resin or metal.

Because the coolant channel 22 is provided over the aforementioned first surface 20a of the channel-equipped separator 20, the hydrogen outlet hole $11_{out}$ is surrounded by the aforementioned first seal member 41 at the first surface 20a. Likewise, in order to prevent the cathode gas from flowing onto the first surface 20a, the air inlet hole $23_{in}$ is surrounded by a second seal member 42, which is different from the first seal member 41, at the first surface 20a.

In one example, it is clear from a contrast between FIG. 3 and FIG. 4 that the peripheral edge of the gas (air) manifold in the channel-equipped separator 20 whose first surface 20a has a channel serving as the coolant channel is provided with a step 25. The step 25 bulges from the principal surface of the channel-equipped separator 20 in the form of a protrusion from the first surface 20a of the channel-equipped separator 20.

In other words, in each fuel cell 100 according to this embodiment, a second surface 22b located at the underside of the step 25 is provided with a gas inlet 24 whose height (opening) is increased by an amount equivalent to the protrusion. Accordingly, in each fuel cell 100 according to this embodiment, the peripheral edge of the manifold of the channel-equipped separator 20 whose first surface 20a has a channel serving as the coolant channel 22 is provided with the step 25 that surrounds the peripheral edge of the manifold to increase the height of the gas inlet 24 disposed at the second surface 22b.

Figures 8, 9:
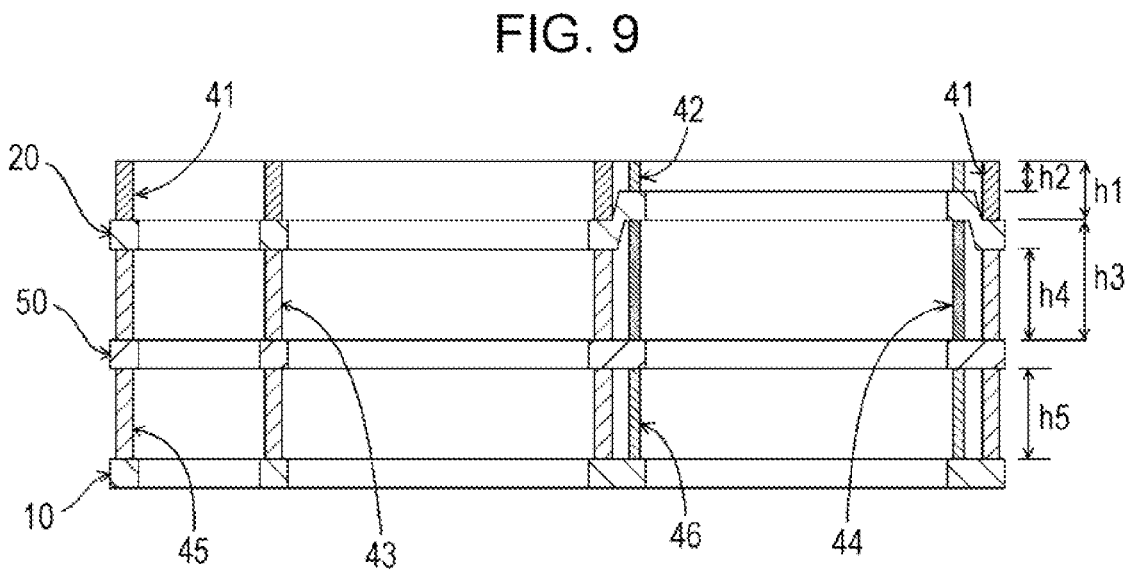
FIG. 8 is a perspective view illustrating a partially extracted area of the flat separator of the fuel cell according to the embodiment.
FIG. 9 is a schematic cross-sectional view taken along line IX-IX in FIG. 3.
Figure 10:
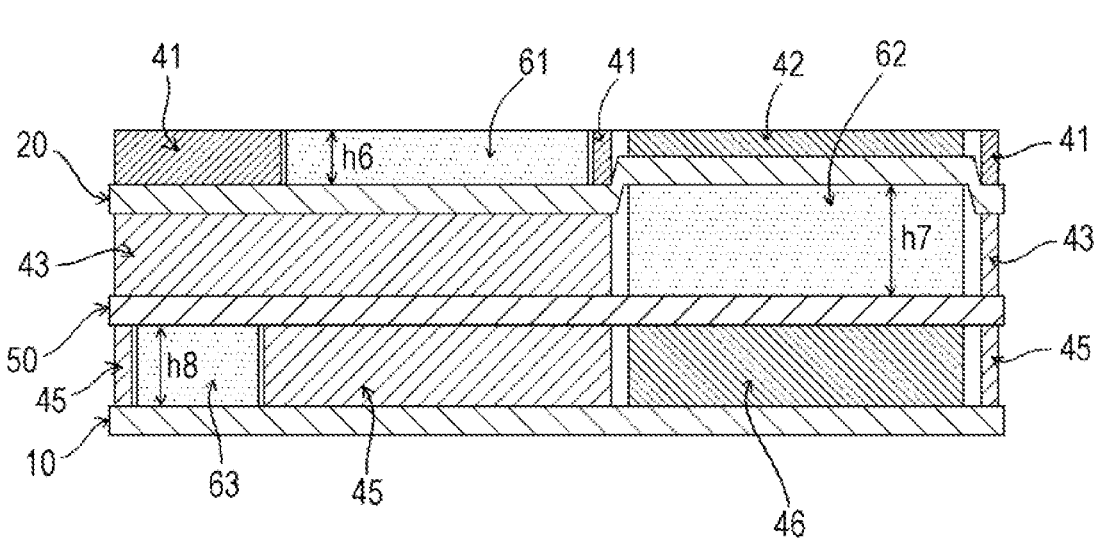
FIG. 10 is a schematic cross-sectional view taken along line X-X in FIG. 3.
Figure 11:
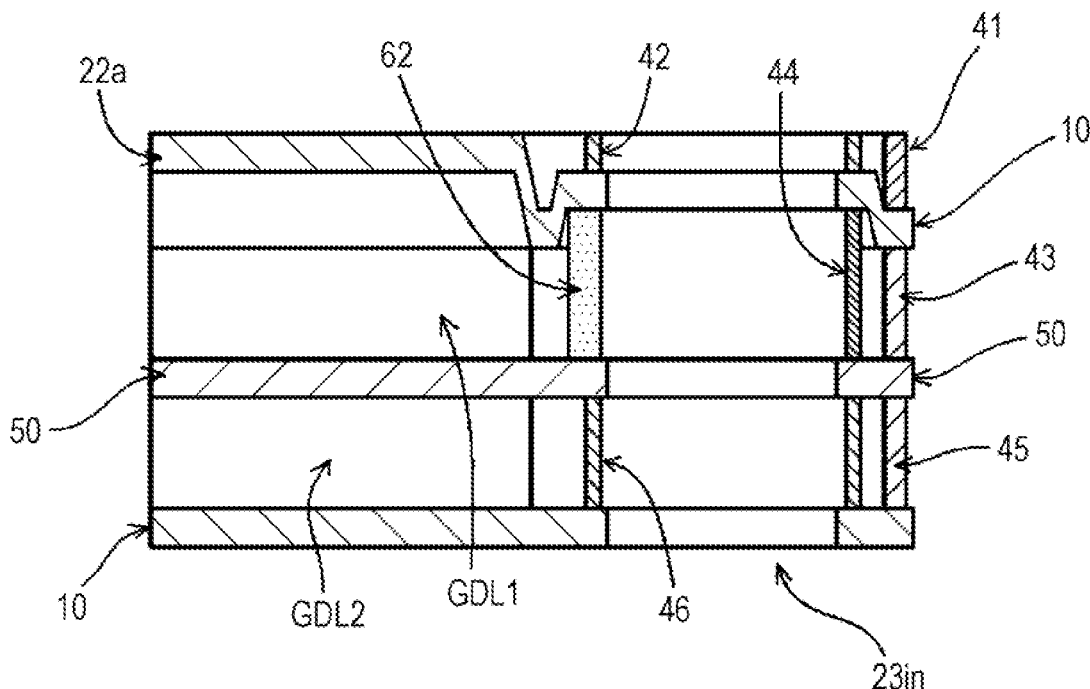
FIG. 11 is a schematic cross-sectional view taken along line XI-XI in FIG. 3.

Furthermore, in each fuel cell 100 according to this embodiment, a shortened seal member (second seal member 42) having a thickness (i.e., a height in the stacking direction) smaller than that of a peripheral seal member (i.e., the first seal member 41) provided in a region other than the peripheral edge of the gas (air) manifold is disposed on the aforementioned step 25 to surround the peripheral edge of the gas (air) manifold. In one example, as illustrated in FIG. 9, the thickness (height h2) of the second seal member 42 according to this embodiment may be set to be smaller than the thickness (height h1) of the aforementioned first seal member 41 by an amount equivalent to the height of the step 25. Accordingly, as illustrated in FIG. 9, when the fuel cells 100 are stacked, the top of a channel groove 22a in the channel-equipped separator 20, the top of the second seal member 42 disposed on the step 25, and the top of the first seal member 41 surrounding the coolant channel 22 are flush with one another.

The first seal member 41, the second seal member 42, and the third seal member 43 to a sixth seal member 46 to be described later may be composed of, for example, any of various known resin materials with an additive appropriately added to silicone rubber serving as a base material, any of various resin materials that enable various bonding methods, such as heat bonding or pressure-sensitive bonding, or a composite material having any of these resin materials, so long as the seal members exhibit the functions described in this embodiment. Although the first seal member 41 and the second seal member 42 are composed of the same material in this embodiment, these seal members may be composed of different materials or may be integrated with each other, so long as the aforementioned thickness can be varied. Furthermore, in view of the ease of assembly, the first seal member 41, the second seal member 42, and the third seal member 43 to the sixth seal member 46 to be described later may each be composed of a known material, such as silicone rubber, capable of self-retaining its shape to a certain extent.

Although the aforementioned second seal member 42 is used in this embodiment, a known welder, such as a laser welder, may be used in place of the second seal member 42.

An inner seal member (i.e., the second seal member 42, the fourth seal member 44, or the sixth seal member 46) located inward of an outer seal member (i.e., the first seal member 41, the third seal member 43, or the fifth seal member 45) and disposed to surround a specific channel may be composed of a material with higher fluidity than the outer seal member by using, for example, a known liquid seal material, such as a two-component seal material.

1.2. Channel Structure Related to Cathode Gas (Air)

A channel structure related to cathode gas (air) in each fuel cell 100 will now be described with reference to FIG.

Figure 5:
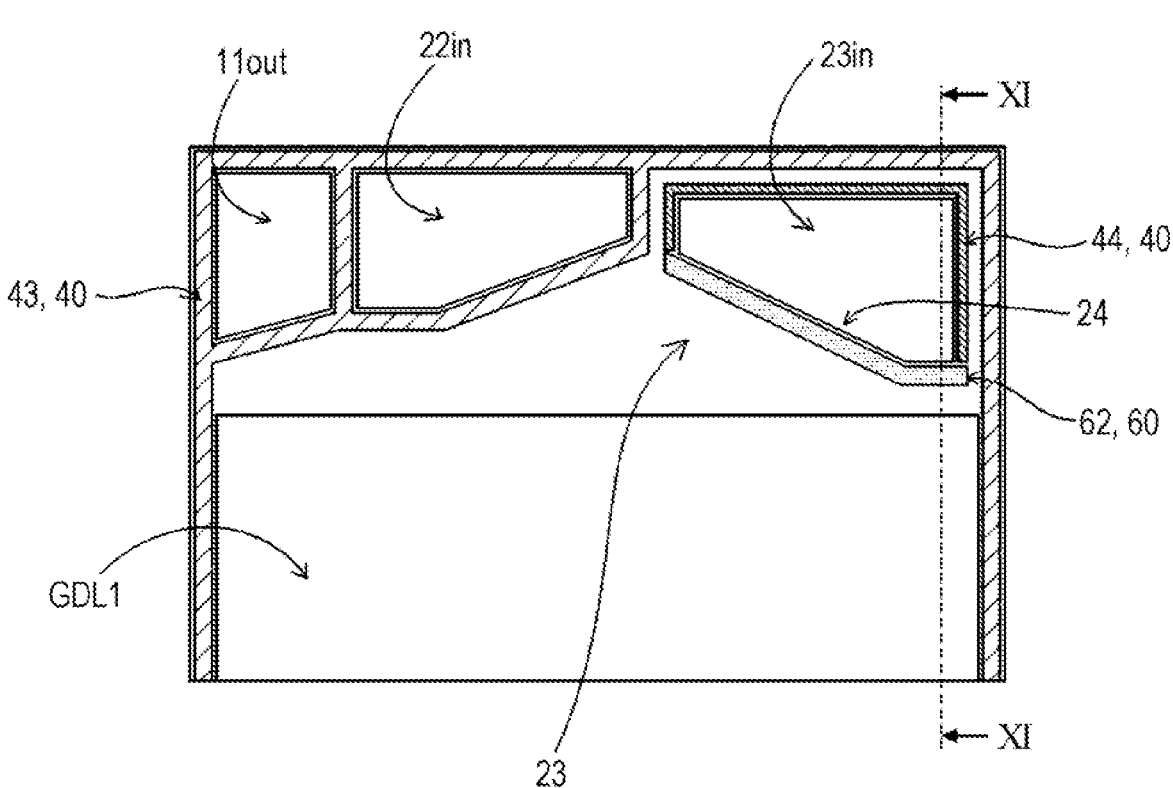
FIG. 5 is a top view illustrating a partially extracted area of a membrane electrode assembly (MEA) of the fuel cell according to the embodiment.
Figure 6:
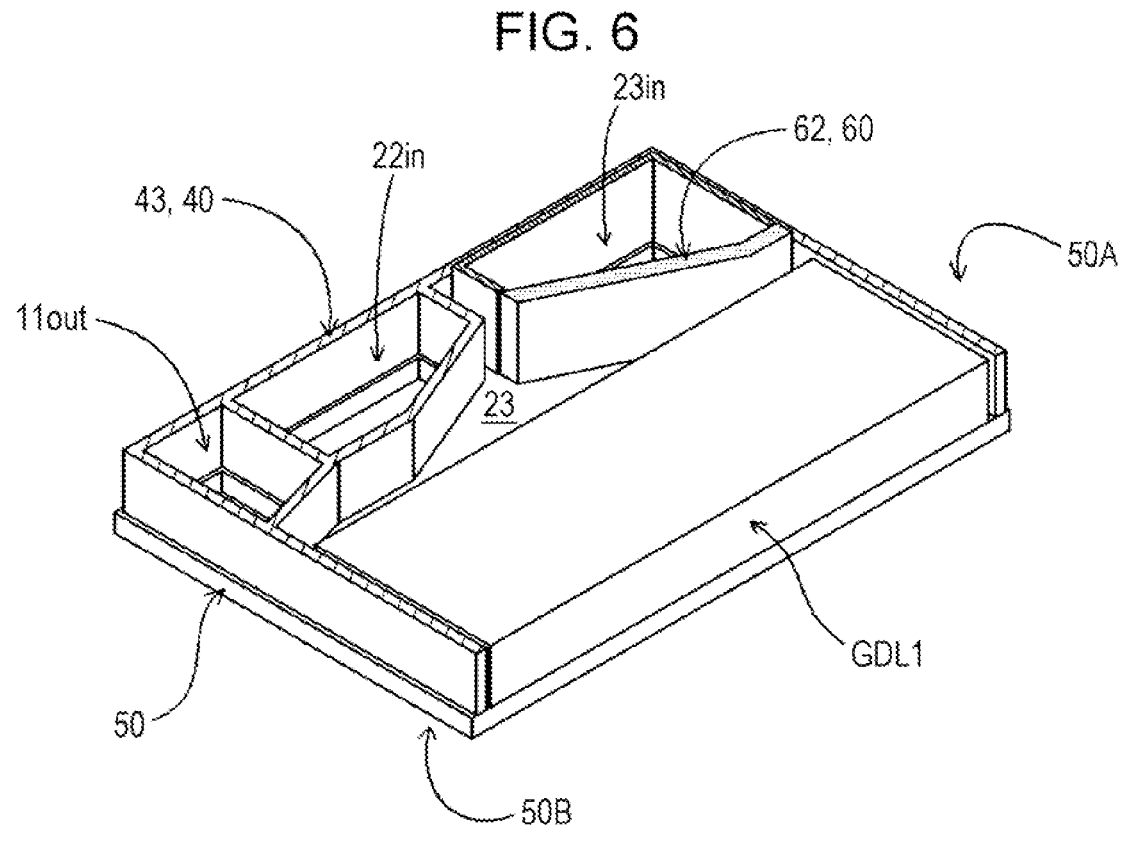
FIG. 6 is a perspective view illustrating a partially extracted area of the MEA of the fuel cell according to the embodiment.

2, FIG. 5, FIG. 6, and FIG. 9. It is clear from FIG. 2, FIG. 5, FIG. 6, and FIG. 9 that the cathode-gas channel 23 in the fuel cell 100 is provided at the second surface 22b of the channel-equipped separator 20. In other words, the cathode-gas channel 23 is provided between a membrane electrode assembly (MEA) 50 and the channel-equipped separator 20.

The MEA 50 is a known membrane electrode assembly having a pair of catalyst layers disposed at opposite surfaces with an electrolyte membrane interposed therebetween. It is clear from FIG. 2 and FIG. 6 that a GDL1 as a known gas diffusion layer is further disposed at a first surface 50a of the MEA 50 according to this embodiment, and that a GDL2 as a known gas diffusion layer is further disposed at a second surface 50b of the MEA 50. Although the GDL1 and the GDL2 are described as being independent of the MEA 50 in this embodiment, the membrane electrode assembly may be defined by including these GDLs.

As illustrated in FIG. 5 and FIG. 6, at the first surface 50a of the MEA 50, the third seal member 43 surrounds the peripheral edge to hermetically seal the cathode-gas channel 23. The hydrogen outlet hole $11_{out}$ and the refrigerant inlet hole $22_{in}$ are separated from each other by the aforementioned third seal member 43, so that the anode gas and the refrigerant are prevented from flowing into the cathode-gas channel 23.

Furthermore, because the cathode-gas channel 23 is provided between the first surface 50a of the MEA 50 and the second surface 22b of the channel-equipped separator 20, the cathode-gas channel 23 surrounding the air inlet hole $23_{in}$ is provided with the aforementioned gas inlet 24.

A second reinforcement member 62 that can distribute the cathode gas (air) is disposed in the aforementioned gas inlet 24. The second reinforcement member 62 distributes the cathode gas flowing in through the air inlet hole $23_{in}$, and has enough strength to ensure the seal performance of another seal surface disposed between the channel-equipped separator 20 and the second seal member 42 and continuing from the second reinforcement member 62 in the stacking direction. A specific example of such a second reinforcement member 62 is a known porous member or metal pressed member composed of resin or metal.

In this embodiment, the fourth seal member 44 is disposed in a region surrounding the air inlet hole $23_{in}$ and excluding the aforementioned second reinforcement member 62. As illustrated in FIG. 9, the thickness of the fourth seal member 44 may be set to be larger than that of the aforementioned third seal member 43 by an amount equivalent to the height of the aforementioned step 25 and be substantially equal to the height of the aforementioned second reinforcement member 62. Accordingly, at the first surface 50a of the MEA 50, the aforementioned fourth seal member 44 and the second reinforcement member 62 may have their tops positioned at substantially the same height and may surround the air inlet hole $23_{in}$ so as to be covered by the step 25.

As illustrated in FIG. 9, in each fuel cell 100 according to this embodiment, the thickness (height) of the second seal member 42 on the step 25 (i.e., at the protruding side) may be set to be equal to a value (i.e., a value from which an amount equivalent to the step is subtracted) obtained by subtracting the thickness of the step 25 from the thickness (height) of the first seal member 41. Likewise, it is clear from FIG. 11 that the thickness (height) of the fourth seal member 44 disposed below the step 25 may be set to be equal to a value obtained by adding the thickness of the step 25 to the thickness (height) of the third seal member 43.

1.3. Channel Structure Related to Anode Gas (Hydrogen)

A channel structure related to anode gas (hydrogen) in each fuel cell 100 will now be described with reference to FIG. 2 and FIG. 7 to FIG. 9. It is clear from FIG. 2 and FIG. 7 to FIG. 9 that the anode-gas channel 11 in the fuel cell 100 is provided at a first surface 10A of the flat separator 10. In other words, the anode-gas channel 11 is provided between the MEA 50 and the flat separator 10.

Figure 7:
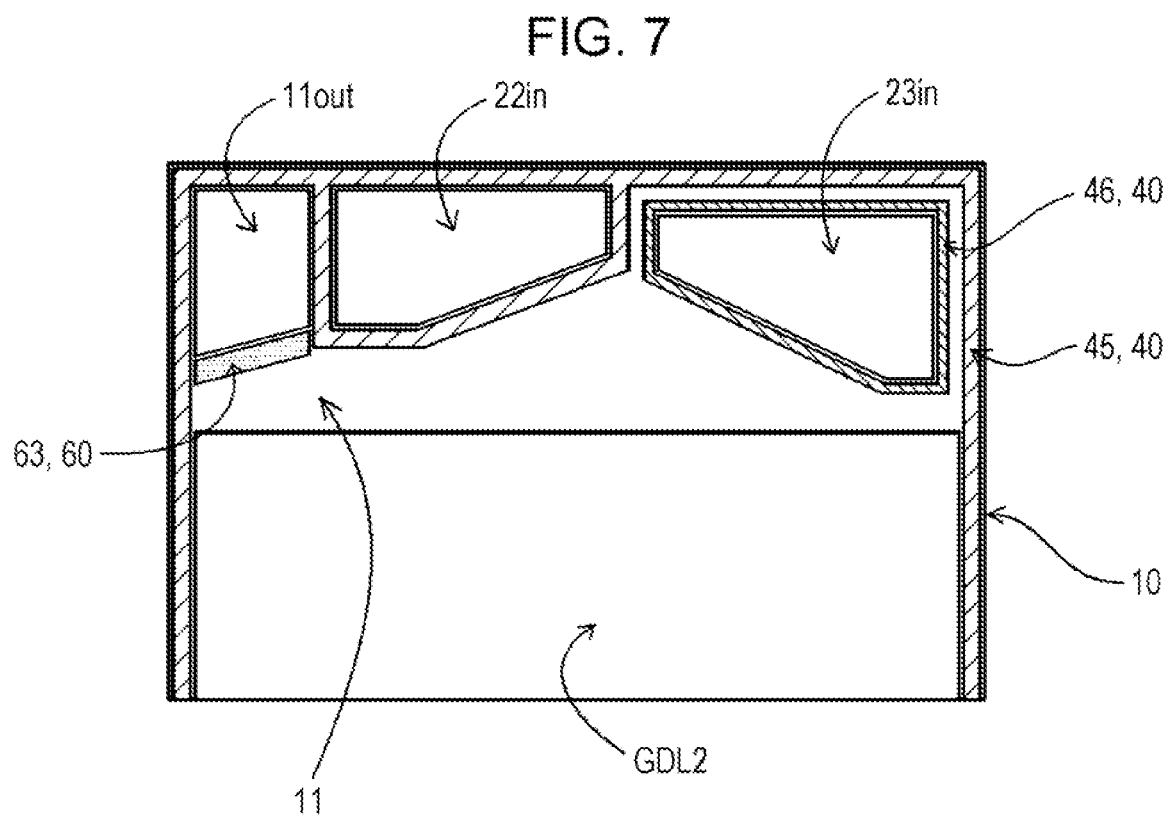
FIG. 7 is a top view illustrating a partially extracted area of a flat separator of the fuel cell according to the embodiment.

As illustrated in FIG. 7 and FIG. 8, at the first surface 10A (i.e., at the second surface 50b of the MEA 50) of the flat separator 10, the fifth seal member 45 surrounds the peripheral edge to hermetically seal the anode-gas channel 11. The refrigerant inlet hole $22_{in}$ is separated from the hydrogen outlet hole $11_{out}$ by the aforementioned fifth seal member 45, so that the refrigerant is prevented from flowing into the anode-gas channel 11. Likewise, the air inlet hole $23_{in}$ is separated from the hydrogen outlet hole $11_{out}$ by the sixth seal member 46 having substantially the same thickness as the aforementioned fifth seal member 45, so that the air is prevented from flowing into the anode-gas channel 11.

As an alternative to this embodiment in which the air inlet hole $23_{in}$ is surrounded and sealed by the sixth seal member 46 that is different from the aforementioned fifth seal member 45, the fifth seal member 45 and the sixth seal member 46 may be integrated with each other such that the sixth seal member 46 is coupled to the fifth seal member 45.

Because the anode-gas channel 11 is provided over the aforementioned first surface 10A of the flat separator 10, a third reinforcement member 63 that can distribute the hydrogen is disposed at the anode-gas channel 11 side around the hydrogen outlet hole $11_{out}$.

The third reinforcement member 63 distributes the hydrogen discharged to the hydrogen outlet hole $11_{out}$, and has enough strength to ensure the seal performance of another seal surface disposed between the MEA 50 and the third seal member 43 and continuing from the third reinforcement member 63 in the stacking direction. A specific example of such a third reinforcement member 63 is a known porous member or metal pressed member composed of resin or metal.

1.4. Thickness (Height) Comparison Between Seal Members and Reinforcement Members The thicknesses of the seal members and the reinforcement members used in each fuel cell 100 according to this embodiment will now be described with reference to FIG. 9 to FIG. 11.

As mentioned above, each fuel cell 100 according to this embodiment includes the seal members 40 (i.e., the first seal member 41 to the sixth seal member 46) at least having different thicknesses. Of the aforementioned seal members 40, the fourth seal member 44 may at least have enough strength to ensure the seal performance of the seal surface continuing in the stacking direction, instead of having tight sealability.

Furthermore, each fuel cell 100 according to this embodiment includes reinforcement members 60 (i.e., the first reinforcement member 61 to the third reinforcement member 63) at least having different thicknesses.

For example, the first seal member 41 to the sixth seal member 46 and the first reinforcement member 61 to the third reinforcement member 63 may have one or more of the following relationships.

Thickness (Height h1) of First Seal Member 41>Thickness (Height h2) of Second Seal Member 42 (Relationship 1)

Thickness (Height h4) of Fourth Seal Member 44>Thickness (Height h3) of Third Seal Member 43 (Relationship 2)

Thickness (Height h5) of Fifth Seal Member 45≈Thickness (Height h5) of Sixth Seal Member 46 (Relationship 3)

Thickness (Height h1) of First Seal Member 41≈Thickness (Height h6) of First Reinforcement Member 61 (Relationship 4)

Thickness (Height h7) of Second Reinforcement Member 62>Thickness (Height h3) of Third Seal Member 43 (Relationship 5)

Thickness (Height h8) of Third Reinforcement Member 63≈Thickness (Height h5) of Fifth Seal Member 45 (Relationship 6)

Thickness (Height) of Step 25≈Thickness (Height h1) of First Seal Member 41−Thickness (height h2) of Second Seal Member 42 (Relationship 7)

As an alternative to this embodiment in which the reinforcement members 60 (i.e., the first reinforcement member 61 to the third reinforcement member 63) are used, the physical structure may be varied depending on an object flowing through each reinforcement member. For example, the first reinforcement member 61 that can distribute a coolant may be a corrugated metallic plate. On the other hand, the second reinforcement member 62 and the third reinforcement member 63 that can distribute gas (air, oxygen) may each be a metallic plate having a gas passing region with pressure-resistance ribs disposed at a predetermined pitch.

As described above, when one of the separators sandwiching the MEA serving as the core of each fuel cell is a flat plate while the other separator is a channel-equipped separator, if the aforementioned step supposedly does not exist, the thickness (height) of the inlet for the gas (i.e., air in this embodiment) produced between the MEA and the channel-equipped separator is equal to about the thickness of the gas diffusion layer (GDL1). Thus, a pressure loss of the air introduced from the manifold may increase due to the narrowness of the gas inlet.

In contrast, in each fuel cell 100 according to this embodiment, the peripheral edge of the manifold in the channel-equipped separator whose first surface has a channel serving as the coolant channel is provided with a step that surrounds the peripheral edge of the manifold to increase the height of the gas inlet disposed at the second surface. Moreover, a shortened seal member (second seal member 42) having a thickness smaller than that of a peripheral seal member (first seal member 41) provided in a region other than the peripheral edge of the manifold is disposed on the step to surround the peripheral edge of the manifold. Accordingly, in the fuel cell 100, even if a flat plate is used as one of the separators, the opening of the aforementioned gas inlet can be increased in accordance with the aforementioned step, thereby achieving both pressure-loss reduction and overall thickness reduction.

Second Embodiment

A fuel cell 110 according to a second embodiment of the disclosure will now be described with reference to FIG. 12 to FIG. 14. Each fuel cell 100 according to the first embodiment described above has the coolant channel 22, the cathode-gas (air) channel 23, and the anode-gas (hydrogen) channel 11 layered in this order from the first surface 20a of the channel-equipped separator 20. In contrast, the fuel cell

110 according to the second embodiment is mainly characterized in having the cathode-gas (air) channel 23, the coolant channel 22, and the anode-gas (hydrogen) channel 11 layered in this order from the second surface 22b of the channel-equipped separator 20.

Therefore, in the second embodiment described below, components similar to the components already described in the first embodiment will be given the same reference signs, and descriptions thereof will be omitted, where appropriate.

Figure 12:
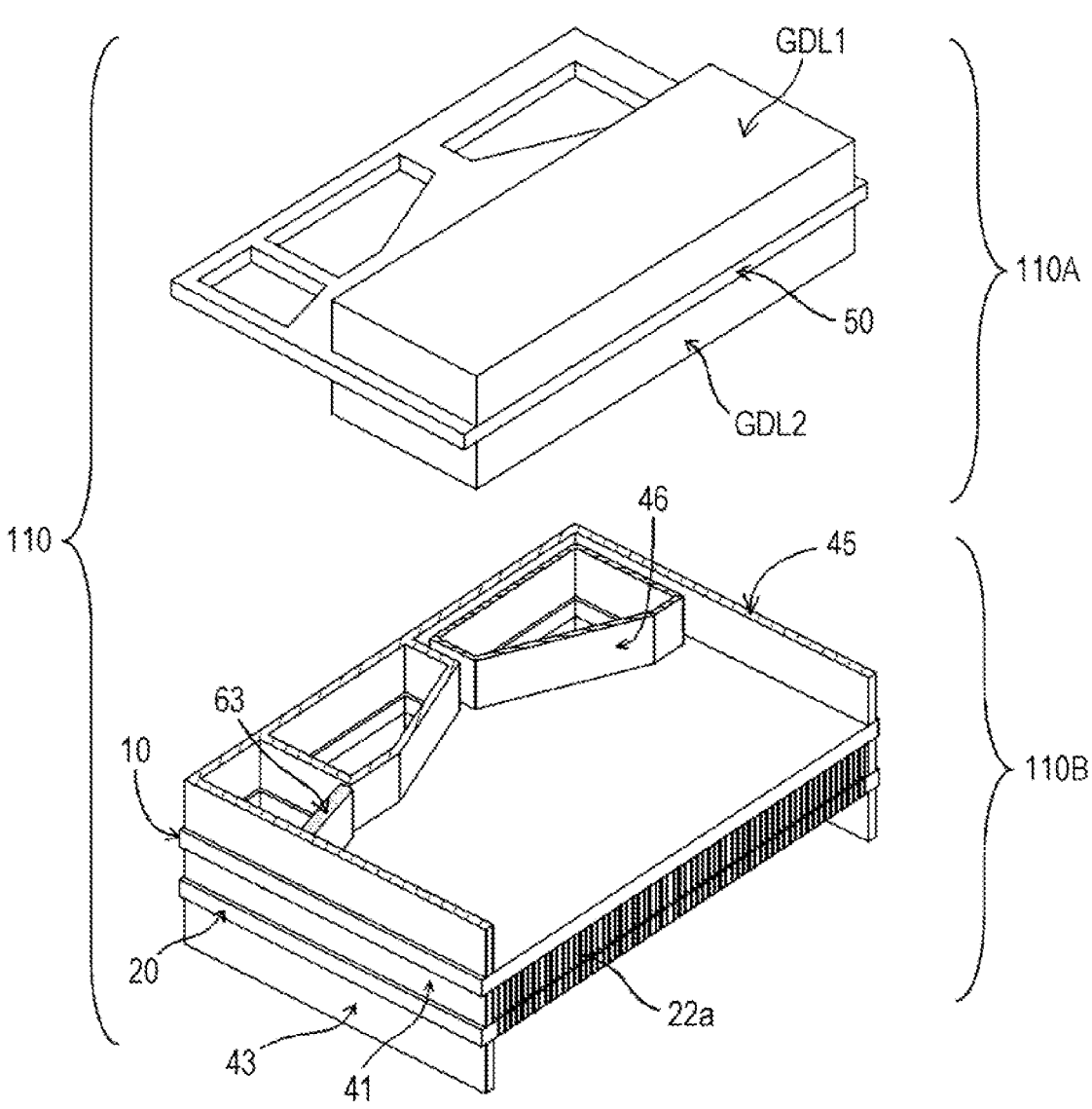
FIG. 12 schematically illustrates a fuel cell stack according to an embodiment.

As illustrated in FIG. 12, the fuel cell 110 includes a first unit 110A in which the GDL1 and the GDL2 sandwich the MEA 50, and a second unit 110B in which the flat separator 10 and the channel-equipped separator 20 are bonded to each other. These first units 110A and second units 110B are alternately stacked one on top of the other so that a fuel cell stack according to this embodiment is formed.

Figures 13, 14:
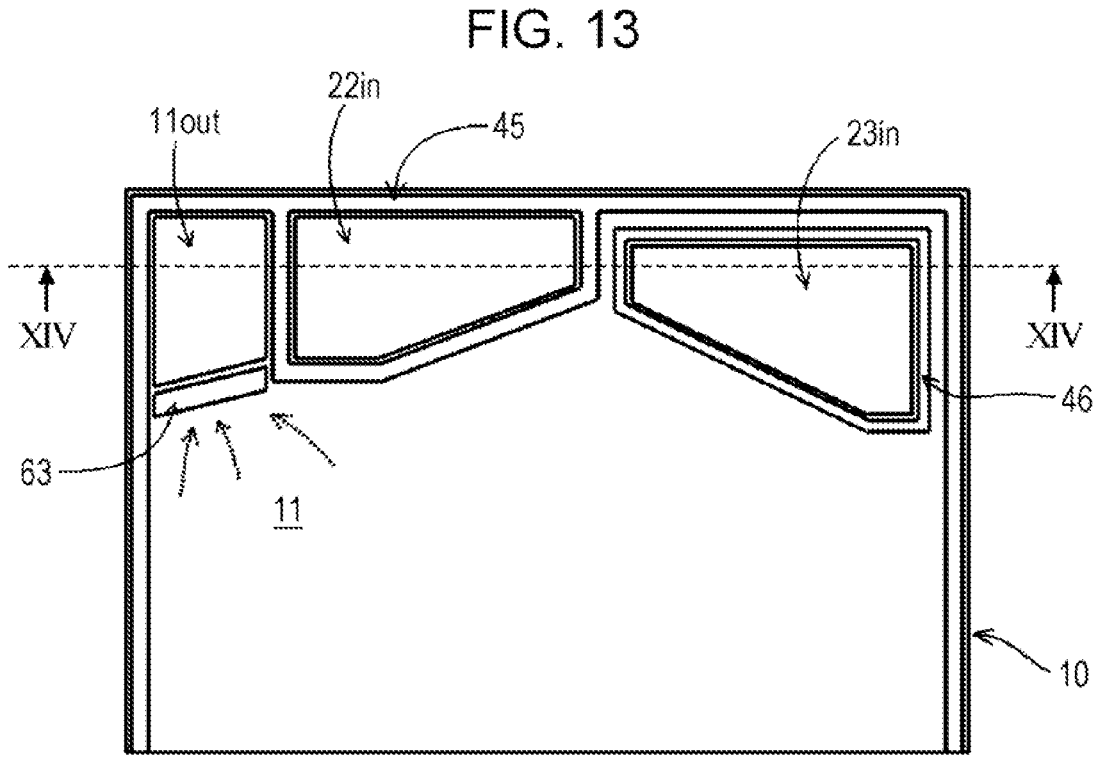
FIG. 13 is a top view partially illustrating the fuel cell stack according to the embodiment.
FIG. 14 is a schematic cross-sectional view taken along line XIV-XIV in FIG. 13.

Therefore, it is clear from a contrast between FIG. 13 and FIG. 14 that the fuel cell 110 has the cathode-gas (air) channel 23, the coolant channel 22, and the anode-gas (hydrogen) channel 11 layered in this order from the second surface 22b of the channel-equipped separator 20. In other words, when the second unit 110B is viewed from the MEA 50, the anode-gas (hydrogen) channel 11, the coolant channel 22, and the cathode-gas (air) channel 23 are layered in this order from the first surface 10A of the flat separator 10.

In the MEA 50 illustrated in FIG. 12, the GDL2 receives anode gas. Therefore, cathode gas flowing through the cathode-gas (air) channel 23 in another fuel cell 110 neighboring this fuel cell 110 flows into the GDL1 of the MEA 50.

In the fuel cell according to each embodiment of the disclosure, for example, the flat separator 10 may be sandwiched between the MEA 50 and the channel-equipped separator 20, as in this embodiment, instead of the MEA 50 being sandwiched between the flat separator 10 and the channel-equipped separator 20.

Although embodiments of the disclosure have been described in detail above with reference to the appended drawings, the embodiments of the disclosure are not limited to these examples. It is apparent to a person with a common knowledge in the technical field to which the embodiments of the disclosure pertain that further alterations to the embodiments and modifications can be made within the technical scope defined in the claims, and it is to be understood that such alterations naturally belong to the technical scope of the embodiments of the disclosure.

For example, although seal members with different thicknesses (heights) are used in each of the above embodiments, seal members (e.g., a combination of the first seal member 41 and the second seal member 42 or a combination of the third seal member 43 and the fourth seal member 44) located in the same layer may be formed as a single continuous seal member.

The aforementioned reinforcement members 60 may be composed of a porous metallic material, such as aluminum or titanium. Furthermore, the pressure resistibility of each reinforcement member 60 may be increased by disposing ribs or pillars adjacent to each other around the reinforcement member 60. Moreover, the aforementioned reinforcement members 60 may be composed of a dense porous material so long as reduction of a pressure loss is maintainable.

As an alternative to the first embodiment described above in which a gap is provided between the inner side of the third seal member 43 and the outer side of the fourth seal member 44, for example, one or more of the third seal member 43 and the fourth seal member 44 may be extended to fill in this gap. By filling in this gap, retention of water can be suppressed near the gas inlet hole. In this case, the gap between the third seal member 43 and the fourth seal member 44 may be filled with another material other than the material of the third seal member 43 and the fourth seal member 44.

The invention claimed is:

1. A fuel cell comprising metallic separators comprising a flat separator and a channel-equipped separator, the fuel cell having an anode-gas channel, a cathode-gas channel, and a coolant channel, wherein a peripheral edge of a manifold of the channel-equipped separator whose first surface has a channel serving as the coolant channel is provided with a step, the step surrounding the peripheral edge of the manifold to increase a height of a gas inlet disposed at a second surface of the channel-equipped separator, and wherein a shortened seal member having a thickness smaller than a thickness of a peripheral seal member provided in a region other than the peripheral edge of the manifold is disposed on the step to surround the peripheral edge of the manifold.

2. The fuel cell according to claim 1, wherein the coolant channel, the cathode-gas channel, and the anode-gas channel are layered sequentially from the first surface.

3. The fuel cell according to claim 1, wherein the cathode-gas channel, the coolant channel, and the anode-gas channel are layered sequentially from the second surface.

4. The fuel cell according to claim 1, wherein a value of the thickness of the shortened seal member is set to be a value obtained by subtracting a thickness of the step from a thickness of a seal member disposed around the shortened seal member.

5. A mobile unit comprising the fuel cell according to claim 1.

6. A mobile unit comprising the fuel cell according to claim 2.

7. A mobile unit comprising the fuel cell according to claim 3.

* * * * *